(12) United States Patent
Sako et al.

(10) Patent No.: US 7,274,642 B2
(45) Date of Patent: Sep. 25, 2007

(54) DATA RECORDING MEDIUM, DATA RECORDING METHOD AND APPARATUS, DATA REPRODUCING METHOD AND APPARATUS, DATA TRANSMITTING METHOD, AND DATA RECEIVING METHOD

(75) Inventors: Yoichiro Sako, Tokyo (JP); Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 10/474,200

(22) PCT Filed: Feb. 14, 2003

(86) PCT No.: PCT/JP03/01552

§ 371 (c)(1),
(2), (4) Date: Oct. 17, 2003

(87) PCT Pub. No.: WO03/071535

PCT Pub. Date: Aug. 28, 2003

(65) Prior Publication Data

US 2004/0114484 A1 Jun. 17, 2004

(30) Foreign Application Priority Data

| Feb. 20, 2002 | (JP) | ............................. 2002-043105 |
| Mar. 25, 2002 | (JP) | ............................. 2002-084045 |

(51) Int. Cl.
*G11B 20/00* (2006.01)
*G11B 11/10* (2006.01)

(52) U.S. Cl. .............................. 369/53.22; 369/53.35; 714/81

(58) Field of Classification Search ............. 369/53.22, 369/53.21, 59.24, 30.04, 30.25, 275.1, 275.3, 369/53.35, 30.11, 53.29, 59.22, 124.07; 714/752, 714/758, 757, 781, 774, 755, 369, 794, 795, 714/81; 386/94, 95, 125, 126
See application file for complete search history.

(56) References Cited

U.S. PATENT DOCUMENTS

| 4,525,838 | A | * | 6/1985 | Patel ........................... 714/755 |
| 4,800,549 | A | * | 1/1989 | Yamagami et al. ....... 369/53.29 |
| 5,224,106 | A | * | 6/1993 | Weng .......................... 714/755 |
| 5,683,253 | A | * | 11/1997 | Park et al. ............... 369/30.04 |
| 5,898,708 | A | * | 4/1999 | Tateishi et al. ............. 714/752 |
| 5,991,911 | A | * | 11/1999 | Zook ........................... 714/758 |
| 6,006,354 | A | * | 12/1999 | McGuinness ................ 714/758 |
| 6,301,638 | B1 | * | 10/2001 | Suzuki et al. ................ 711/112 |
| 6,327,691 | B1 | * | 12/2001 | Huang ......................... 714/781 |

(Continued)

FOREIGN PATENT DOCUMENTS

JP 63-140461 6/1988

(Continued)

*Primary Examiner*—Andrea Wellington
*Assistant Examiner*—Kim-Kwok Chu
(74) *Attorney, Agent, or Firm*—Oblon, Spivak, McClelland, Maier & Neustadt, P.C.

(57) ABSTRACT

A recording medium having at least a lead-in area, a data recording area to which data is recorded, and a lead-out area, wherein the data recording area comprises a first recording area portion to which data that has been encoded with an error correction code is recorded; and a second recording area portion to which at least data that has been encoded with a plurality of types of generation polynomials as error correction codes.

40 Claims, 8 Drawing Sheets

U.S. PATENT DOCUMENTS

| | | |
|---|---|---|
| 6,516,064 B1 * | 2/2003 | Osawa et al. ............... 380/201 |
| 6,535,858 B1 * | 3/2003 | Blaukovitsch et al. ........ 705/57 |
| 6,570,837 B1 * | 5/2003 | Kikuchi et al. .......... 369/275.1 |
| 6,587,948 B1 * | 7/2003 | Inazawa et al. ............. 713/193 |
| 6,643,452 B1 * | 11/2003 | Ohbi ....................... 369/30.25 |
| 6,718,501 B1 * | 4/2004 | Brody et al. ................. 714/752 |
| 6,912,683 B2 * | 6/2005 | Rifaat et al. ................ 714/774 |

FOREIGN PATENT DOCUMENTS

| | | |
|---|---|---|
| JP | 8-153331 | 6/1996 |
| JP | 9-73414 | 3/1997 |
| JP | 9-128890 | 5/1997 |
| JP | 2001-094543 | 4/2001 |
| JP | 2001-94543 | 4/2001 |
| JP | 2001-135021 | 5/2001 |
| JP | 2001-156772 | 6/2001 |

* cited by examiner

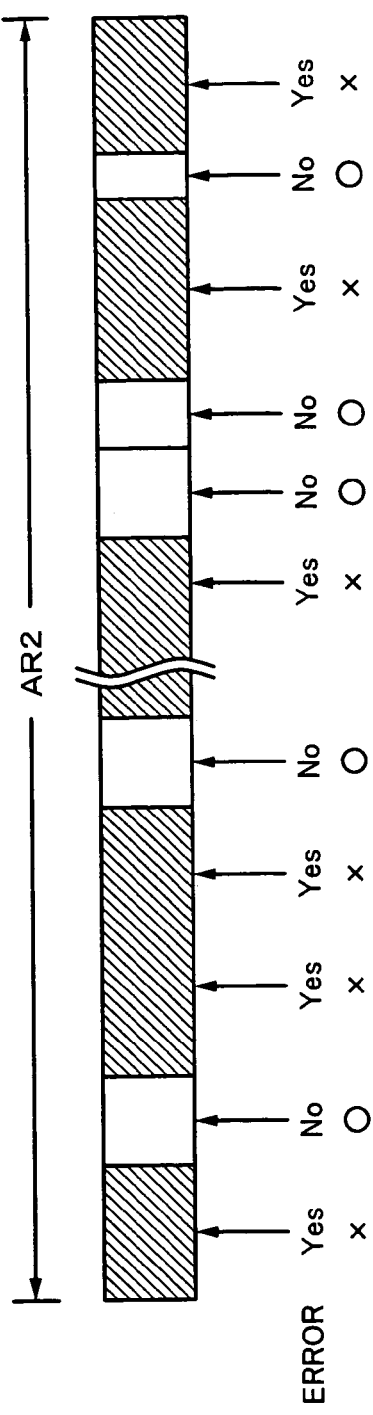
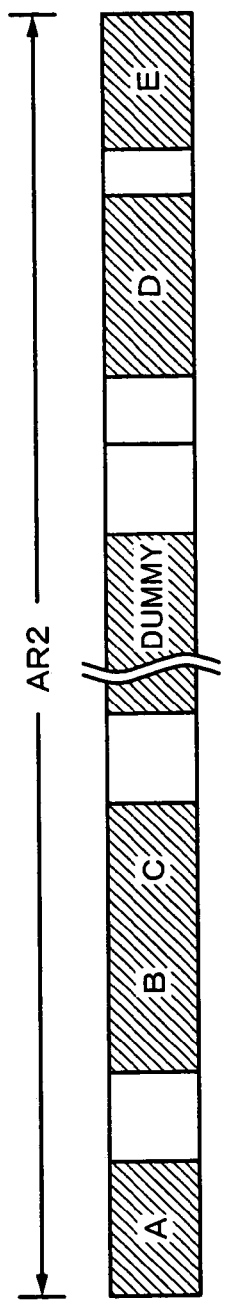
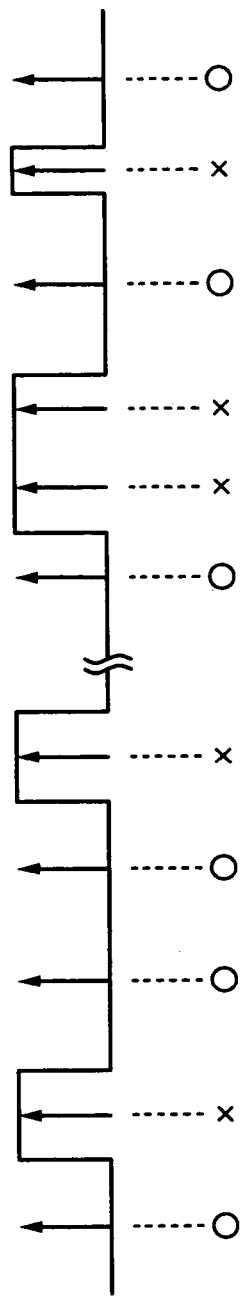
Fig. 9A  Fig. 9B  Fig. 9C  Fig. 9D

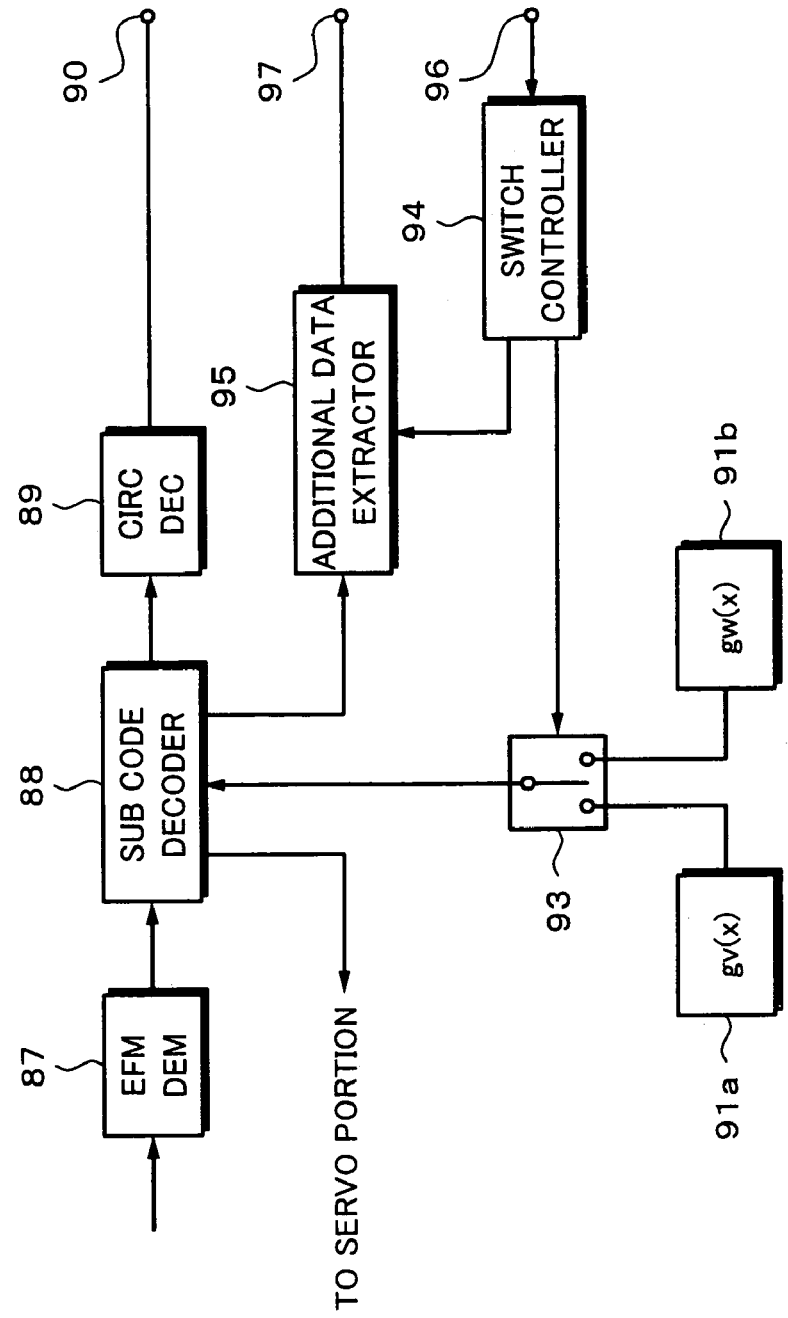

US 7,274,642 B2

DATA RECORDING MEDIUM, DATA RECORDING METHOD AND APPARATUS, DATA REPRODUCING METHOD AND APPARATUS, DATA TRANSMITTING METHOD, AND DATA RECEIVING METHOD

TECHNICAL FIELD

The present invention relates a data recording medium on which content data is recorded, a data recording method, a data recording apparatus, a data reproducing method, a data reproducing apparatus, a data transmitting method, and a data receiving method.

BACKGROUND ART

Since optical discs such as a CD (Compact Disc) and a CD-ROM (Compact Disc Read Only Memory) are easy to handle and are produced at relatively low cost, they have been widely used as recording mediums for storing data. In recent years, a CD-R (Compact Disc Recordable) disc, on which data can be recorded once, and a CD-RW (Compact Disc ReWritable) disc, on which data can be rewritten, have come out. Thus, data can be more easily recorded on such recordable optical discs than before. As a result, optical discs such as a CD-DA disc, a CD-ROM disc, a CD-R disc, and a CD-RW disc have become the mainstream of data recording mediums. In addition, in recent years, audio data is compressed according to the MP3 (MPEG1 Audio Layer-3) and the ATRAC (Adaptive TRansform Acoustic Coding) 3 and recorded on the CD-ROM disc, the CD-R disc, the CD-RW disc, and so forth.

However, as a CD-R disc and a CD-RW disc have come out, data recoded on a CD-DA disc and a CD-ROM disc can be more easily copied than before. As a result, a problem about copyright protection has arisen. Thus, when content data is recorded to a recordable optical disc, it is necessary to take measures to protect content data.

As a method for protecting content data recorded on a CD-DA disc and a CD-ROM disc, it is determined whether the objective disc is an original disc or a disc whose content data has been copied from an original disc (hereinafter referred to as copied disc). When the objective disc is an original disc, a copy operation can be permitted. In contrast, when the objective disc is a copied disc, a further copy operation can be prohibited.

To determine whether the objective disc is an original disc or a copied disc, the following method has been proposed. In the proposed method, an error is intentionally inserted into predetermined data. When content data is reproduced from the objective disc, depending on whether or not the inserted error is detected, it is determined whether the objective disc is an original disc or a copied disc. However, in that method, since a part of data is an error, the method cannot be used as a conventional standard such as the CD standard. In addition, it is difficult to bury desired data such as an encryption key in predetermined data.

Therefore, an object of the present invention is to provide a data recording medium, a data recording method, a data recording apparatus, a data reproducing method, a data reproducing apparatus, a data transmitting method, and a data receiving method that allow desired information to be buried and used as a format standard.

DISCLOSURE OF THE INVENTION

To solve the foregoing problem, claim 1 of the present invention is a recording medium having at least a lead-in area, a data recording area to which data is recorded, and a lead-out area, wherein the data recording area comprises:

a first recording area portion to which data that has been encoded with an error correction code is recorded; and a second recording area portion to which at least data that has been encoded with a plurality of types of generation polynomials as error correction codes.

Claim 11 of the present invention is a recording medium having at least a lead-in area, a data recording area to which data is recorded, and a lead-out area, wherein the data recording area comprises:

a first recording area portion to which data that has been encoded with an error correction code is recorded; and a second recording area portion to which at least data that has been encoded with a plurality of types of primitive polynomials and/or generation polynomials as error correction codes.

Claim 22 of the present invention is a recording method for a recording medium, comprising the steps of:

when data is recorded to the recording medium, recording data that has been encoded with an error correction code to a first recording area portion; and recording data that has been encoded with a plurality of types of primitive polynomials and/or generation polynomials as error correction codes to a second recording area portion.

Claim 35 of the present invention is a recording apparatus for a recording medium, comprising:

an error correction code encoding process portion for performing an error correction code encoding process for input data;

a generating portion for generating data that has been encoded with a plurality of types of respective primitive polynomials and/or generation polynomials as error correction codes;

a signal processing portion, to which output data of the signal process portion and data that has been encoded with the plurality of types of primitive polynomials and/or generation polynomials as error correction codes, for performing a recording signal process for the supplied data; and a recording portion, to which output data of the signal process portion is supplied, for recording the supplied data to a recording medium.

Claim 24 of the present invention is a reproducing apparatus for a recording medium having at least a lead-in area, a data recording area to which data is recorded, and a lead-out area, wherein the data recording area comprises a first recording area portion to which data that has been encoded with an error correction code is recorded; and a second recording area portion to which at least data that has been encoded with a plurality of types of generation polynomials as error correction codes, the reproducing apparatus, comprising:

a head portion for reading data from the recording medium;

a demodulating process portion for performing a demodulating process for data that has been read from the recording medium by the head portion; and a signal process portion for performing an error detecting process for data that has been output from the demodulating process portion and that has been read from the second recording area portion with any one of the plurality of types of primitive polynomials and/or generation polynomials as error correction codes.

Claim 27 of the present invention is a reproducing method for a recording medium having at least a data recording area in which data is recorded, the data recording area having a first recording area portion to which data that has been encoded with an error correction code is recorded; and a second recording area portion to which at least data that has been encoded with a plurality of types of generation polynomials as error correction codes, the reproducing method, comprising the steps of:

performing a demodulating process for data that has been read from the recording medium; and performing an error detecting process for data for which the demodulating process has been performed and that has been read from the second recording area portion with any one of the plurality of types of primitive polynomials and/or generation polynomials as error correction codes.

Claim 30 of the present invention is an identifying method for a recording medium having at least a lead-in area, a data recording area to which data is recorded, and a lead-out area, wherein the data recording area comprises a first recording area portion to which data that has been encoded with an error correction code is recorded; and a second recording area portion to which at least data that has been encoded with a plurality of types of generation polynomials as error correction codes, the identifying method, comprising the steps of:

performing a demodulating process for data that has been read from the recording medium;

performing an error detecting process for data for which the demodulating process has been performed and that has been read from the second recording area portion with any one of the plurality of types of primitive polynomials and/or generation polynomials as error correction codes; and identifying the recording medium as an original recording medium or a copied recording medium corresponding to the result of the error detecting process.

Claim 33 of the present invention is a data transmitting method, comprising the steps of:

when data is transmitted, transmitting first data that has been encoded with an error correction code and second data that has been encoded with a plurality of types of primitive polynomials and/or generation polynomials as error correction codes.

Claim 37 of the present invention is a data receiving process method, comprising the steps of:

receiving data composed of first data that has been encoded with an error correction code and second data that has been encoded with a plurality of types of primitive polynomials and/or generation polynomials as error correction codes; and performing an error detecting process for the second data of the received data with one of the plurality of types of primitive polynomials and/or generation polynomials as error correction codes.

BRIEF DESCRIPTION OF DRAWINGS

FIGS. 9A, B, C, and D are schematic diagrams for describing an area in which generation polynomials as error detection codes with which a sub code of the optical disc according to the present invention is encoded are switched.

FIG. 13 is a block diagram showing another example of the reproducing apparatus according to the present invention.

BEST MODES FOR CARRYING OUT THE INVENTION

Next, with reference to the accompanying drawings, an embodiment of the present invention will be described. According to the present embodiment, a multi-session optical disc is used as a recording medium. The optical disc has almost the same physical standard such as size as a CD. Information on the disc can be optically read by a conventional CD player and a conventional CD-ROM drive.

On the optical disc, non-encrypted content data having the same format as a conventional CD-DA disc and encrypted content data has been recorded. The encrypted content data is for example CD-ROM format or CD-DA format audio or video content data that has been encrypted.

Figure 1:
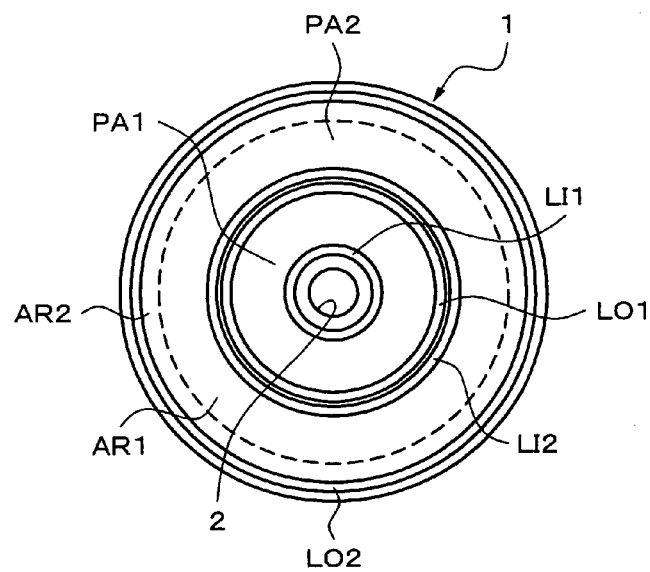
FIG. 1 is a plan view for describing an optical disc according to the present invention.

As shown in FIG. 1, the multi-session optical disc 1 according to the present invention has a diameter of 120 mm. At the center of the optical disc 1, a hole 2 is formed. The optical disc 1 may have a diameter of 80 mm, which is same as so-called CD single disc. As the optical disc 1, there are a reproduction-only disc, a recordable disc, and a rewritable disc.

When the optical disc 1 is a reproduction-only optical disc, as a material that composes a recording layer, namely a reflection layer, aluminum is used. When the optical disc 1 is a reproduction-only optical disc, data such as content data is recorded as physical pits. Normally, the reproduction-only optical disc is produced in the following manner. A disc substrate is produced by an injection molding method using a stamper. An aluminum reflection layer is formed on a surface on which physical pits are formed.

When the optical disc 1 is a recordable optical disc, an organic coloring matter such as phthalocyanine or cyanine is used for a recording layer. When data is written to the recordable optical disc, the temperature of the recording layer made of an organic coloring matter of the disc is raised by laser. As a result, the recording layer made of the organic coloring matter is heated and thereby the disc substrate is thermally deformed.

When the optical disc 1 is a rewritable optical disc, a phase change material is used for a recording layer. As an example of the phase change material, an alloy of Ag—In—Sb—Te (silver-indium-antimony-tellurium) is used. Such a phase change material has a crystal phase and an amorphous phase. When the intensity of the light beam is strong, the recording layer made of the phase change material is heated over its melting point and then rapidly cooled. As a result, the recording layer made of the phase change material becomes the amorphous state. When the intensity of the light beam is relatively weak, the recording layer made of the phase change material is heated to around the crystallization temperature and then gradually cooled. As a result, the recording material becomes the crystallization state. When the phase change material is varied, data is recorded to the optical disc 1 or erased therefrom.

Figure 2:
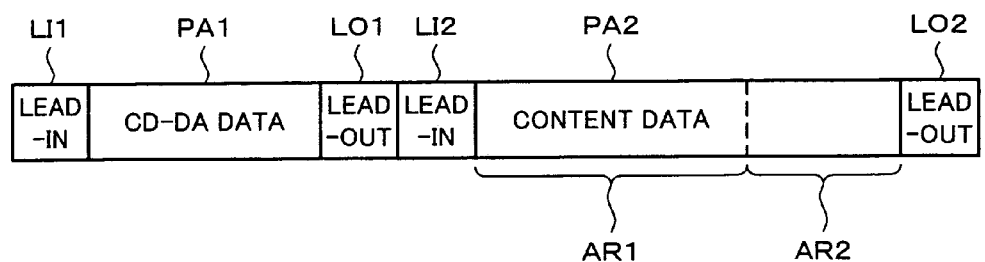
FIG. 2 is a schematic diagram for describing the optical disc according to the present invention.

As shown in FIG. 1 and FIG. 2, the optical disc 1 is of multi-session type. On the innermost periphery of the optical disc 1, a first lead-in area LI1 is formed. On an outer periphery of the lead-in area LI1, a first program area PA1 is formed. Outside the first program area PA1, a first lead-out area LO1 is formed. In the first program area PA1, in the same recording format as a CD-DA disc, audio data is recorded. In other words, data is encoded with an error correction code according to the same error correction code encoding system (hereinafter, referred to as CIRC (Cross Interleave Reed-Solomon Code) 4 system) and recorded. Since the recording format of data in the first program area PA1 is the same as that of a CD-DA standard and the data has not been encrypted, the data can be reproduced by a conventional music reproduction CD-DA player.

In the CD standard, as an error correction code encoding system, the CIRC of which an error correction code encoding process is dually performed for a C1 sequence (in the vertical direction) and a C2 sequence (in the diagonal direction) is used. Data that has been encoded with the error correction code is EFM (eight to fourteen modulation)-modulated in the unit of one frame and recorded.

Outside the first lead-out area LO1, a second lead-in area LI2 is formed. On an outer periphery of the lead-in area LI2, a second program area PA2 is formed. Outside the second program area PA2, a second lead-out area LO2 is formed. In the second program area PA2, as content data, audio data that has been compressed according to for example the ATRAC3 is encrypted and recorded. As data in the second program area PA2, data is encoded with an error correction code according to a system named CIRC4 system or CIRC7 system and recorded.

In addition, the second program area PA2 contains two areas AR1 and AR2. Sub code data recorded in the first program area PA and the area AR1 is encoded with the same error detection code as a conventional CD-DA disc. On the other hand, sub code data recorded in the area AR2 is encoded with different generation polynomials as error detection codes as will be described later.

The unit delay amount D of the interleaving circuit according to the CIRC4 system is different from that according to the CIRC7 system. In other words, according to the CIRC4 system, the interleaving circuit designates D=4 frames and separates adjacent symbols by four frames each. The CIRC4 system of D=4 frames is used in a current CD-DA disc. According to the CIRC4 system, the maximum delay amount becomes 27D (=108 frames). The total interleave length becomes 109 frames. According to the CIRC7 system, the interleaving circuit designates D=7 frames and separates adjacent symbols by seven frames each. The CIRC7 system of D=7 frames has been proposed for a double density CD. According to the CIRC7 system, the maximum delay amount becomes 27D (=189 frames). The total interleave length becomes 190 frames.

The total interleave length defines the correction performance against a burst error of which much data successively fails due to a fingerprint adheres on the disc, a scratch thereon, and so forth. The total interleave length is proportional to the correction performance for a burst error. In the double density CD, an improvement of correction performance against a burst error has been desired. Thus, in the double density CD, an error correction code according to the CIRC7 system has been proposed so as to improve correction performance against a bust error.

Figure 3:
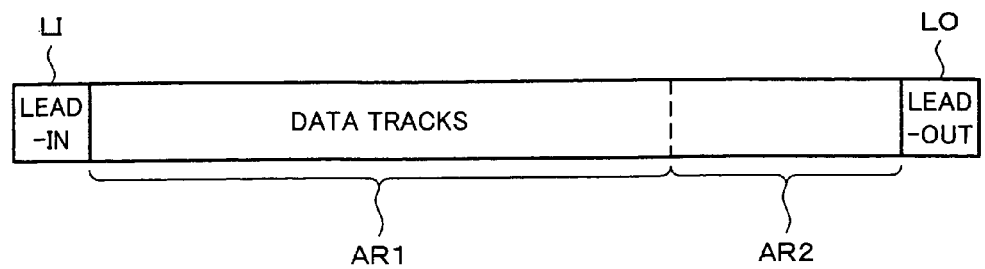
FIG. 3 is a schematic diagram for describing another example of the optical disc according to the present invention.

Beside the foregoing multi-session optical disc 1, the present invention can be applied to a one-session optical disc as shown in FIG. 3.

In the example shown in FIG. 3, a first lead-in area LI is formed on the innermost periphery of the optical disc. A program area PA is formed on an outer periphery of the lead-in area LI. A lead-out area LO is formed outside the program area PA. The program area PA is divided into an area AR1 and an area AR2. In the program area PA, data that has been encrypted and that has been encoded with the error correction code according to the CIRC4 system is recorded. However, data recorded in the program area PA may not have been encrypted. As will be described later, sub code data that are recorded in the area AR2 has been encoded with different generation polynomials as error detection codes.

It should be noted that the position of the area AR2 on the disc is not limited as shown in FIG. 3. Alternatively, the area AR2 may be formed in the lead-in area other than the program area. Generation polynomials as error detection codes with which sub code data recorded in the area AR2 is encoded may be switched.

Figure 4:
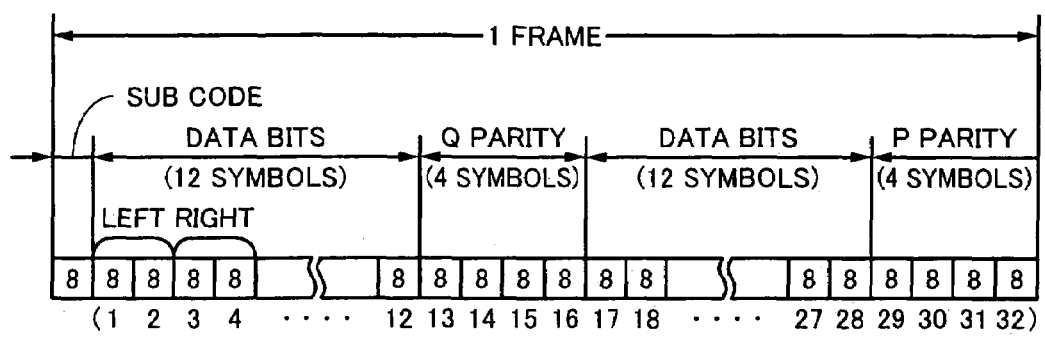
FIG. 4 is a schematic diagram for describing a recording format of the optical disc according to the present invention.

FIG. 4 shows one frame of a CD data structure that has not been EFM modulated. As shown in FIG. 3, when audio data is sampled with 16 bits, one frame is composed of 24 symbols of data bits, four symbols of a Q parity, four symbols of a P parity, and one symbol of a sub code. 24 symbols of data bits are composed of six samples on the left (L) and six samples on the right (R). One symbol is made of eight bits of which 16 bits are divided by two. Data of one frame recorded on the disc is converted from eight bits into 14 bits by the EFM modulation. In addition, a direct current component suppression bit and a frame sync are added to data of one frame.

Thus, one frame recorded on the disc is composed of:

| | |
|---|---|
| Frame sync | 24 channel bits |
| Data bits | 14 · 24 = 336 channel bits |
| Sub code | 14 channel bits |
| Parity | 14 · 8 = 112 channel bits |
| Margin bits | 3 · 34 = 102 channel bits |

Thus, the total number of channel bits of one frame is 588 channel bits.

Figure 5:
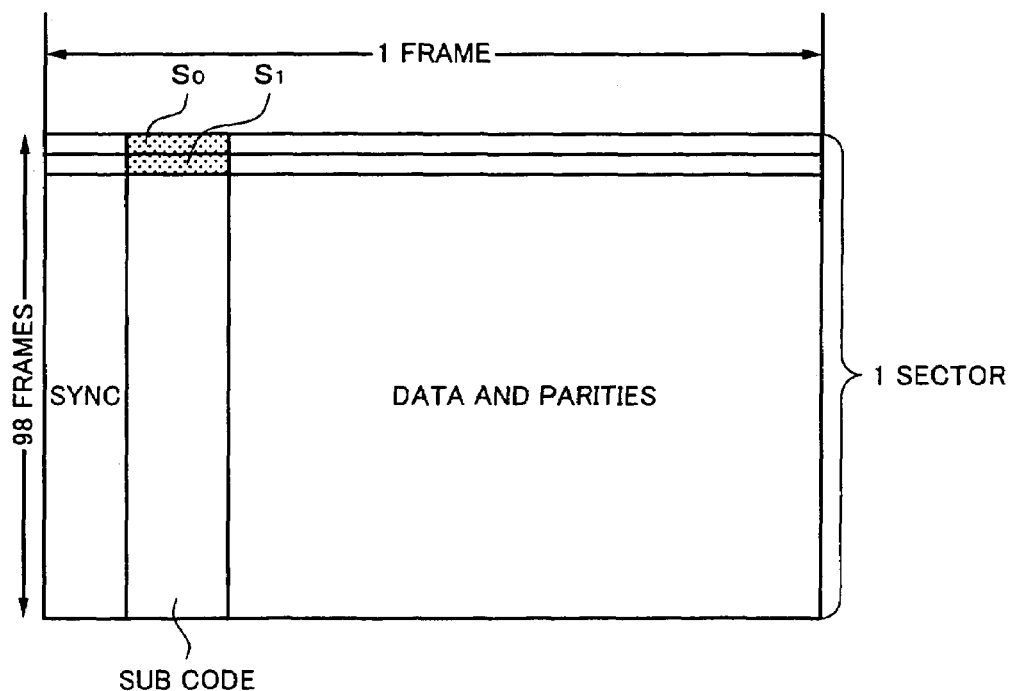
FIG. 5 is a schematic diagram for describing the recording format of the optical disc according to the present invention.

A collection of 98 frames is referred to as sub code frame. One sub code frame is equivalent to 1/75 second of a reproduction time of a conventional CD. FIG. 5 shows a sub code frame of which 98 frames are rearranged so that they are successive in the vertical direction. A sub code of one symbol of each frame contains one bit of each of eight channels P to W. As shown in FIG. 5, one sector is composed of data in the period (98 frames) for a sub code. A sub code of the first two frames of 98 frames is sub code frame syncs S0 and S1. When data of an optical disc is recorded to a CD-ROM or the like, one sector is composed of 98 frames (2,352 bytes), which is a sub code completion unit.

R to W channels are used for a special purpose for a still picture such as Karaoke's subtitle. P and Q channels are used for the track position controlling operation for the pickup in reproducing digital data recorded on the disc.

In the lead-in area of the inner periphery portion of the disc, P channel is used to record a signal whose level is "0". In the lead-out area of the outer periphery portion of the disc, P channel is used to record a signal whose level changes between "0" and "1" at a predetermined period. In the program area formed between the lead-in area and the lead-out area of the disc, P channel is used to record a signal whose level is "1" between music programs and whose level is "0" in each program. P channel is used to detect the beginning of each music program in reproducing digital audio data recorded on CD.

Figure 6:
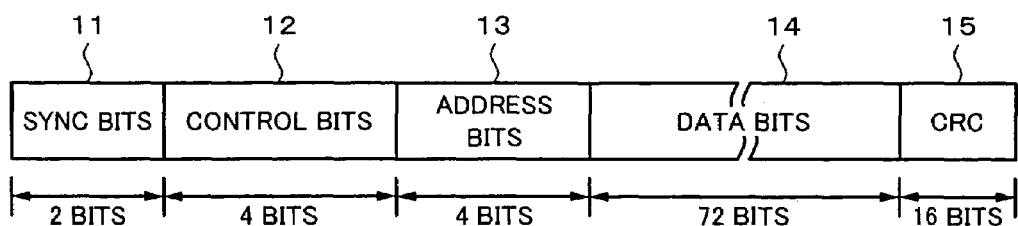
FIG. 6 is a schematic diagram for describing a sub code frame of a sub code of Q channel.

Q channel is used to precisely control the reproducing operation of digital audio data recorded on the CD. As shown in FIG. 6, one sub-code frame of Q channel is composed of a synchronous bit portion 11, a control bit portion 12, an address bit portion 13, a data bit portion 14, and a CRC bit portion 15.

The synchronous bit portion 11 is composed of data of two bits. A part of the foregoing synchronous pattern is recorded to the synchronous bit portion 11. The control bit portion 12 is composed of data of four bits. Data that represents the number of audio channels and identifications for emphasis, digital data, and so forth is recorded to the control bit portion 12. When the data of four bits of the control bit portion 12 is "0000", the data represents that 2-channel audio without pre-emphasis. When the data of four bits of the control bit portion 12 is "1000", the data represents 4-channel audio without pre-emphasis. When the data of four bits of the control bit portion 12 is "0001", the data represents 2-channel audio with pre-emphasis. When the data of four bits of the control bit portion 12 is "1001", the data represents 4-channel audio with pre-emphasis. When the data of four bits of the control bit portion 12 is "0100", the data represents non-audio data track. The address bit portion 13 is composed of data of four bits. A control signal that represents the format and type of data stored in the data bit portion 14 is recorded to the address bit portion 13.

The CRC bit portion 15 is composed of data of 16 bits. Data for detecting an error of cyclic redundancy check code (CRC) is recorded to the CRC bit portion 15. An object from which an error is to be detected is a total of 80 bits of the control bit portion 12, the address bit portion 13, and the data bit portion 14.

When encoding is performed with CRC, a polynomial of which an information bit sequence of 80 bits is shifted by 16 bits is divided by a generation polynomial g (x). A polynomial of the remainder is represented as bits. The resultant bits are added to the CRC portion 5. The relation between the polynomial and bits is represented in binary notation (as bits) in the descending order of degrees for example a polynomial $x^5+x^4+x^2+1$ is represented as (110101). When decoding is performed with CRC, a polynomial that represents data of 96 bits including the CRC portion 15 is divided by a generation polynomial g (x) and then it is determined whether or not the data is exactly divisible. In other words, when encoding is performed, since the remainder is added, if there is no error, the data must be exactly divided by the generation polynomial g (x). When the remainder is "0", it represents that the data is exactly divided by the generation polynomial g (x) and the result represents that there is no error. In contrast, when the remainder is not "0", it represents that the data is not exactly divided by the generation polynomial g (x) and the result represents that there is an error.

The CD standard uses gv $(x)=x^{16}+x^{12}+x^5+1$ as a CRC generation polynomial. According to the present embodiment, as a generation polynomial, gw $(x)=x^{16}+x^{15}+x^2+1$, which is different from gv (x), is provided. In the area AR1 of the foregoing program area, encoding is performed with the generation polynomial gv (x) as an error detection code. On the other hand, in the area AR2, with the generation polynomials gv (x) and gw (x) that are switched as error detection codes, encoding is performed. In the area AR2, sub code data that has been encoded with those generation polynomials is recorded. When generation polynomials whose highest degrees are the same and whose coefficients are different are switched, the numbers of CRC bits thereof are the same. Thus, the data format is not changed. However, the present invention is not limited to generation polynomials that have such a relation. In other words, generation polynomials whose highest orders are different may be used. In that case, the number of CRC bits generated becomes shorter or longer than for example 16 bits. In that case, 96 bits as the length of the sub code data except for a sync is not changed.

Figure 7:
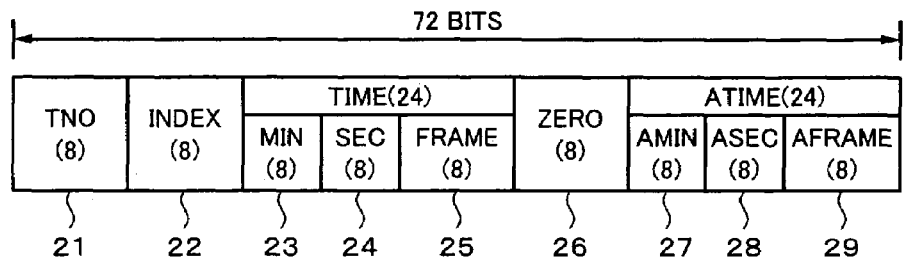
FIG. 7 is a schematic diagram showing the format of mode 1 in which time information is recorded as a sub code of Q channel.

The data bit portion 14 is composed of data of 72 bits. When the data of four bits of the address bit portion 13 is "0001" (namely, mode 1), time codes (position information) as shown in FIG. 7, are recorded in the data bit portion 14. Namely, the data bit portion 14 is composed of a track number portion (TNO) 21, an index portion (INDEX) 22, an elapsed time portion (a minute component portion (MIN) 23, a second component portion (SEC) 24, a frame number portion (FRAME) 25), a zero portion (ZERO) 26, an absolute time portion (a minute component portion (AMIN) 27, a second component portion (ASEC) 28, and a frame number portion (AFRAME) 29). Each portion of the data bit portion 14 is composed of data of eight bits.

The track number portion (TNO) 21 is represented in two-digit binary coded decimal (BCD) notation. When the track number portion (TNO) 21 is "00", it represents a lead-in track number of a track from which data reading operation starts. When the track number portion (TNO) 21 is "01" to "99", it represents a track number corresponding to a music program number, a movement number, or the like. When the track number portion (TNO) 21 is "AA" in hexadecimal notation, it represents a lead-out track number of a track at which the data reading operation stops.

The index portion (INDEX) 22 is represented in two-digit BCD notation. When the index portion (INDEX) 22 is "00", it represents temporary stop (namely pause). When the index portion (INDEX) 22 is "01" to "99", it represents a sub-track number of a music program, a movement, or the like.

Each of the minute component portion (MIN) 23, the second component portion (SEC) 24, and the frame number portion (FRAME) 25 is represented in two-digit BCD notation. A total of six digits of the minute component portion (MIN) 23, the second component portion (SEC) 24, and the frame number portion (FRAME) 25 represents elapsed time (TIME) of each music program or each movement. Eight bits of the zero portion (ZERO) 26 are all "0s".

Each of the minute component portion (AMIN) 27, the second component portion (ASEC) 28, and the frame number portion (AFRAME) 29 is represented in two-digit BCD notation. A total of six digits of the minute component portion (AMIN) 27, the second component portion (ASEC)

28, and the frame number portion (AFRAME) 29 represents the absolute time (ATIME) starting from the first music program.

Figure 8:
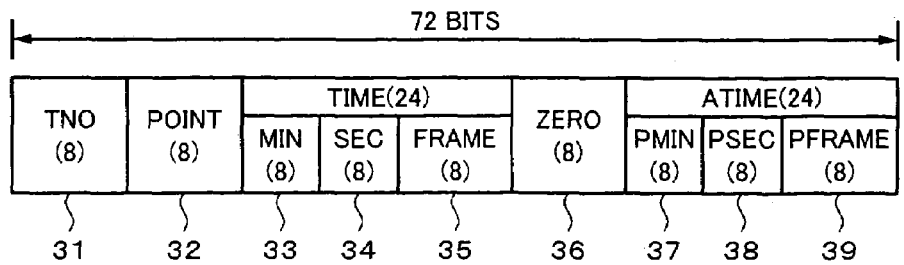
FIG. 8 is a schematic diagram for describing the format of a sub code in a TOC area.

As shown in FIG. 8, the data bit portion 24 of TOC (Table Of Contents) in the lead-in area of the disc is composed of a track number portion (TNO) 31, a point portion (POINT) 32, an elapsed time portion (a minute component portion (MIN) 33, a second component portion (SEC) 34, a frame number portion (FRAME) 35), a zero portion (ZERO) 36, and an absolute time portion (a minute component portion (PMIN) 37, a second component portion (PSEC) 38, and a frame number portion (PFRAME) 39). Each of the portions of the data bit portion 14 is composed of data of eight bits.

Each of the track number portion (TNO) 31, the elapsed time minute component portion (MIN) 33, the elapsed time second component portion (SEC) 34, and the elapsed time frame number portion (FRAME) 35 is fixed to "00" in hexadecimal notation. As with the foregoing zero portion (ZERO) 26, all the eight bits of the zero portion (ZERO) 36 are "0s".

When the point portion (POINT) 32 is "A0" in hexadecimal notation, the absolute time minute component portion (PMIN) 37 represents the first music program number or the first movement number. When the point portion (POINT) 32 is "A1" in hexadecimal notation, the absolute time minute component portion (PMIN) 37 represents the first music program number or the first movement number. When the point portion (POINT) 32 is "A2" in hexadecimal notation, the absolute time minute component portion (PMIN) 37, the absolute time second component portion (PSEC) 38, and the absolute time frame number portion (PFRAME) 39 represent the absolute time (PTIME) at which the lead-out area starts. When the point portion (POINT) 32 is represented in two-digit BCD notation, each of the absolute time minute component portion (PMIN) 37, the absolute time second component portion (PSEC) 38, and the absolute time frame number portion (PFRAME) 39 represents an address at which each music program or each movement starts as absolute time (PTIME).

Thus, although in Q channel, the format in the program area of the disc is slightly different from the format in the lead-in area thereof, time information of 24 bits is recorded. The CD standard prescribes that more than nine sub code frames of sub code data of Q channel in mode 1 shown in FIG. 7 are contained in any 10 successive sub code frames on the disc. As described above, a sub code frame represents 98 successive frames that compose one unit of a sub code and that start with two frames as a sync pattern.

On the other hand, the CD standard prescribes that in the case of a sub code of any of mode 2 to mode other than mode 1, at least one sub code frame should be present in 100 successive sub code frames. Mode 2 and mode 3 are used to record a UPC/EAN (Universal Product Code/European Article Number) code and an ISRC (International Standard Recording Code) code, respectively. Mode 4 is used in the CD-V standard. Mode 5 is used for a lead-in area of a multi-session CD-EXTRA.

FIG. 9A shows for example data for several seconds, data for one track, or the like recorded in the area AR2 of the optical disc 1 shown in FIG. 1 and FIG. 2 or the optical disc shown in FIG. 3. Data for one second contains for example 75 sub code frames.

In FIG. 9A, hatched areas are recording areas for a sub code encoded with a generation polynomial gw (x) as an error detection code. On the other hand, non-hatched areas are recording areas for a sub code encoded with a generation polynomial gv (x) as an error detection code. The area AR2 is reproduced and each sub code frame is decoded (an error is detected) with the generation polynomial gv (x). In this case, in the area AR2, sub code frames are extracted from extracting (sampling) positions denoted by arrow marks and errors are detected therefrom.

In the following description, for generality, the extracting positions of sub code data are not fixed. However, actually, all sub code frames will be extracted. In this case, the extracting positions are constant at intervals of sub code frames (98 frames: 1/75 second).

In the area AR2, in the frame number AFRAME (see FIG. 7) (0 to 74) of sub code data of Q channel, only a sub code of a predetermined frame number (for example "5") is encoded with the generation polynomial gw (x) as an error detection code. When positions at which sub code frames are encoded with gw (x) are pre-designated, the influence of an error that occurs in the recording/reproducing process can be suppressed. In the conventional CD player or CD/CD-ROM drive, errors are detected in both the area AR1 and the area 2 with the generation polynomial gv (x). Thus, when the frame number is "5", errors are detected therefrom. If only sub codes whose lower digits are "5" are encoded with the generation polynomial gw (x) as an error detection code, errors are detected every 10 frames as with "05", "15", ..., "65". With the detected results, additional data can be added.

On the other hand, in the new type recording and/or reproducing apparatus that can deal with the new type optical disc 1 of which the generation polynomials gv (x) and gw (x) are switched in the same relation as the recording operation, when the frame number is "5", the generation polynomials are switched from gv (x) to gw (x). Thus, the data of the sub code frame can be read as data that does not haven an error. In the new type recording and/or reproducing that can deal with the optical disc 1, additional data can be recoded to a sub code frame that is treated as data that does not have an error.

Assuming that no error occurs in data that is recorded or reproduced, when the data is decoded with the generation polynomial gv (x) as an error detection code, at a position at which a CRC is generated with the generation polynomial gv (x), no error is detected. On the other hand, at a position (hatched area) of which a CRC is generated with the generation polynomial gw (x), an error is detected. Thus, a decoded result (error detection result) is obtained depending on whether or not an error occurs. Information of the decoded result is used as additional data. When a portion at which an error is detected is assigned one bit "0" and a portion at which no error is detected is assigned, in the case shown in FIG. 9A, additional data (01001 ... 011010) is obtained. The additional data can be used as identification data that identifies the objective disc as an original disc or a copied disc.

On the other hand, in the new type recording and/or reproducing apparatus that can deal with the optical disc 1, the generation polynomials gv (x) and gw (x) are applied to the area AR2 in the same relation as the recording operation and errors are detected therefrom. As a result, additional data is reproduced. In that case, data that is detected as data that does not have an error by one of the generation polynomials may be used as additional data. The additional data can be used as identification data that identifies the optical disc 1 is an original disc or a copied disc or identification data that identifies encryption key data, a part thereof, or disc identification data that is unique to each disc. Since additional data is recorded as sub code data of Q channel, the additional data can be represented as a predetermined combination data of for example time codes.

FIG. 9B shows an example of additional data recorded in the area AR2. In the area AR2, sub code data A, sub code data B, and sub code data C of time codes or the like, dummy data of a sub code format, sub code data D, and sub code data E are detected as data that does not have an error with the generation polynomial gw (x). On the other hand, data detected as data that does not have an error with the generation polynomial gv (x) is a regular sub code, in which additional data is not recorded. With the dummy data, when encryption key data is recorded as additional data, the secrecy of the data is improved. As a method for improving the secrecy of additional data, the extracting positions thereof can be changed. Alternatively, data detected as data that does not have an error can be used as additional data.

When data is reproduced from the area AR2 shown in FIG. 9B, portions denoted by arrow marks shown in FIG. 9C are extracted. In addition, a switching control of which the generation polynomials for detecting errors are switched is performed. In FIG. 9C, a low level represents a period for which the generation polynomial gw (x) is selected, whereas a high level represents a period for which the generation polynomial gv (x) is selected. Information that represents which of two types of error detection codes has been selected may be used as additional data.

FIG. 9D shows an error detection result in the case that data in the area AR2 shown in FIG. 9A is decoded with the generation polynomial gw (x). The error detection result shown in FIG. 9D is reverse of the error detection result in the case that the generation polynomial gv (x) shown in FIG. 9A is used. Alternatively, with a combination of the error detection results of the two generation polynomials, additional data may be reproduced. When two error detection results are combined, an error that actually occurs can be determined. In other words, assuming that when an error actually occurs at an extracting position, the two error detection results represent an error. Thus, the error can be actually and securely detected. On the other hand, since the probability of which both two error detection results represent no error is very low, the probability of which the error is mistakenly undetected is very low.

As described above, data A to E detected as those that do not have errors with the generation polynomial gw (x) may be encrypted as encryption key data or a part thereof in the program area PA2 of the multi-session type disc 1. In addition, with a combination of information of the error detection results (foregoing (01001 . . . 011010) and data A to E, encryption key data or a part thereof may be generated. These pieces of data are processed with a particular key generation function and thereby encryption key data is generated. In FIG. 9B, each piece of data is recorded one time. However, since the sub code format does not have an error correction function, it is preferred to perform a multiple recording operation for repeatedly recording data A to E.

Figure 10:
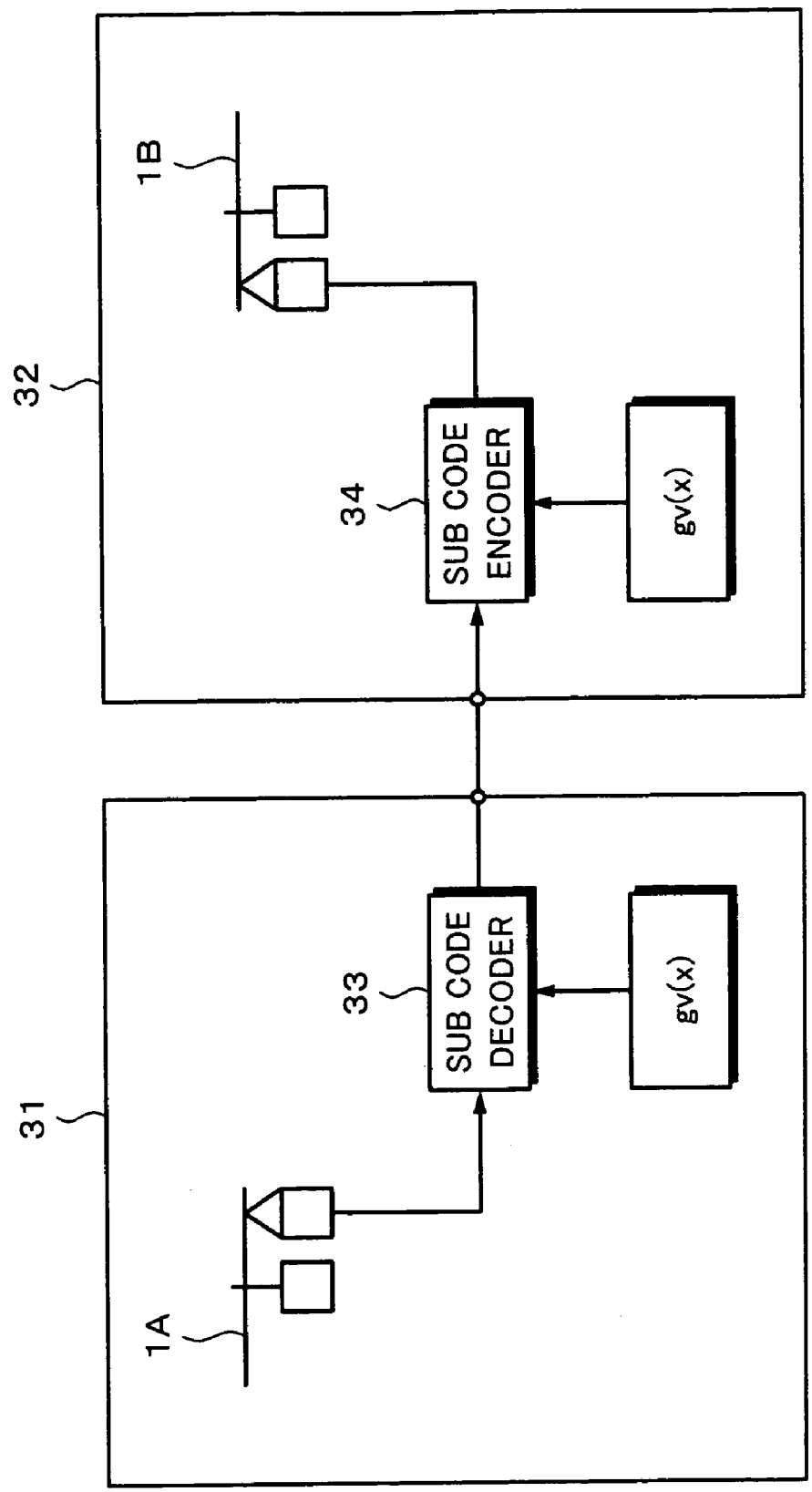
FIG. 10 is a schematic diagram for describing a determining process for determining whether the objective disc is an original disc or a copied disc.

Next, with reference to FIG. 10, the theory of which an objective disc is identified as an original disc or a copied disc according to the present embodiment will be described. FIG. 10 shows an outline of a process for disc-copying data from an original optical disc 1A to an optical disc 1B.

In FIG. 10, the original optical disc 1A is the optical disc according to the present invention. As shown in FIGS. 9A to 9D, in an area AR2 of the optical disc 1A, data that has been encoded the generation polynomial gv (x) as an error detection code and data that has been encoded with the generation polynomial gw (x) as an error detection code are mixedly recorded. The original optical disc 1A is loaded to a reproducing apparatus 31. Data is read from the optical disc 1A by the reproducing apparatus 31. The reproducing apparatus 31, which reproduces data from one of the conventional optical discs CD-DA, CD-ROM, CD-R, and CD-RW, has a sub code decoder 33 corresponding to an error detection code encoding system with the generation polynomial gv (x).

The sub code decoder 33 performs an error detecting process for sub code data of the original optical disc 1A loaded in the reproducing apparatus 31. As shown in FIG. 9A, in the area AR2 formed on the original optical disc 1A, sub code data that has been encoded with an error detection code has been recorded. When the sub code decoder 33 performs the error detecting process for data reproduced from the area AR2, at a portion that has been encoded with the other generation polynomial gw (x) as an error detection code, an error is always detected.

When an error is detected, a process that varies depending on the apparatus is performed. Normally, when an error is detected, a sub code is interpolated. In other words, a time code is interpolated. Alternatively, assuming that an abnormality occurs, the reproducing operation for the optical disc is stopped. When the reproducing operation for the optical disc 1A is stopped in the assumption of occurrence of abnormality, although the data can be prevented from being copied from the optical disc 1A, according to the present invention, the portion at which an error is detected is interpolated.

Reproduced data that has reproduced from the optical disc 1A by the reproducing apparatus 31 is sent to a recording apparatus 32. Sub code data for which the interpolating process has been performed on the reproducing apparatus 31 side is supplied to a sub code encoder 34 of the recording apparatus 32. The sub code encoder 34 formats sub code data of Q channel. In this case, the error detection code encoding process is performed for the sub code data with the generation polynomial gv (x). In such a manner, data of which sub code of Q channel has been re-encoded is recorded on the optical disc 1B. Thus, in the area AR2 of the optical disc 1B, the sub code data that has been encoded with gv (x) as an error detection code is recorded.

Consequently, when the sub code data reproduced from the area AR2 of the copied optical disc 1B does not have an error, the error detection result represents no error. The error detection result that represents whether or not there is an error on the original optical disc 1A shown in FIG. 9A is different from the error detection result of the copied optical disc 1B. Thus, the optical disc 1B is determined as a copied disc. As a result, depending on the error detection result with the generation polynomial gv (x), it can be determined whether the optical disc loaded to the apparatus is an original disc or a copied disc.

Figure 11:
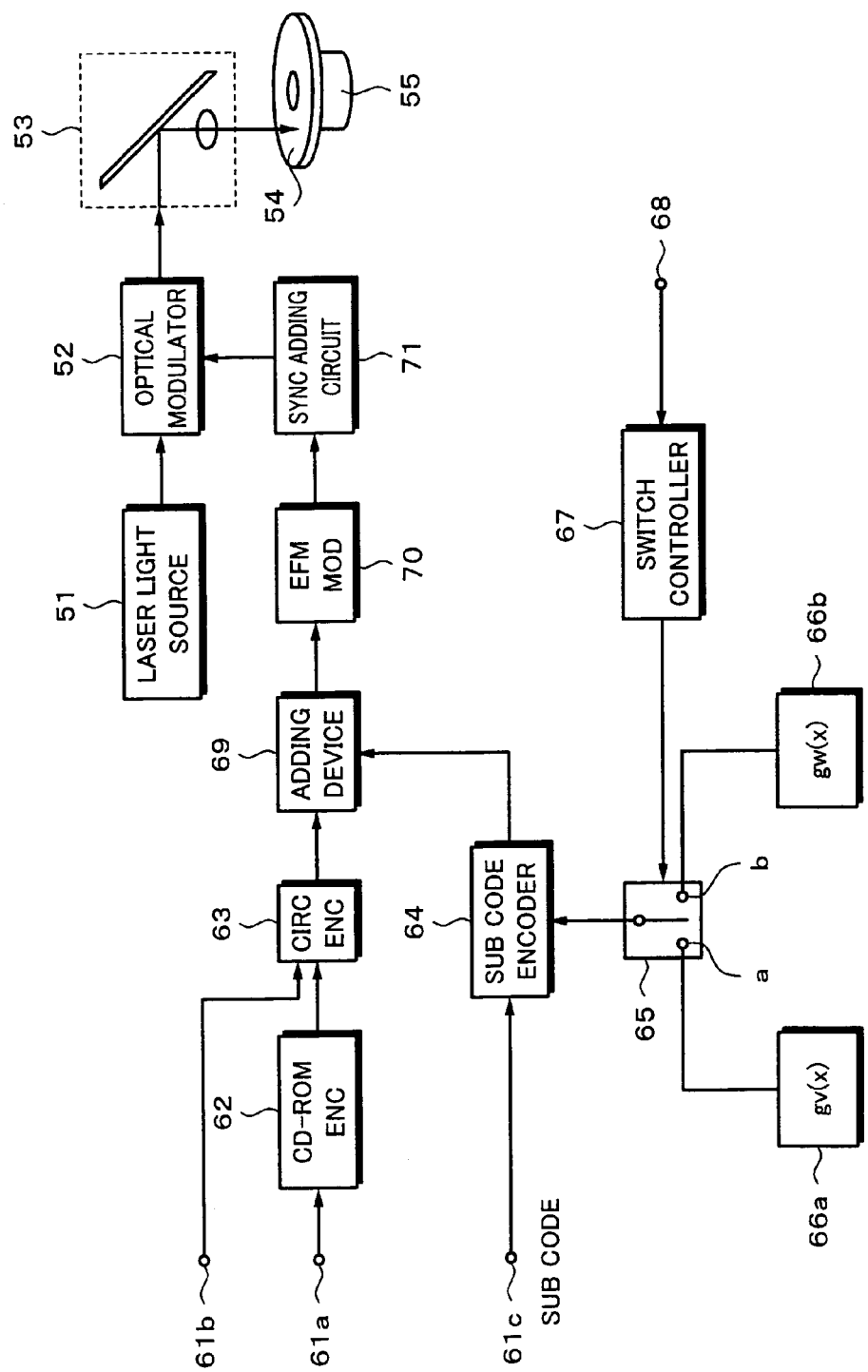
FIG. 11 is a block diagram showing an example of a recording apparatus according to the present invention.

FIG. 11 shows an example of a recording apparatus according to the present invention. For simplicity, in the example, the present invention is applied to a one-session optical disc 1 as shown in FIG. 3. In this case, it is assumed that an encrypting process has been performed for data to be recorded. FIG. 11 shows the case that the optical disc 1 is a read-only disc and that the present invention is applied to a mastering system. However, it should be noted that the present invention can be applied to the case that data is recorded to a recordable data recording medium for example a CD-R disc/CD-RW disc.

The mastering apparatus has a laser light source 51 that is a gas laser such as an Ar ion laser, a He—Cd laser, or a Kr ion laser or a semiconductor laser; an acoustooptic effect type or electrooptic optical modulator 52 that modulates laser light emitted from the laser light source 51; and an optical pickup 53 that has an objective lens or the like that, condenses laser light through the optical modulator 52 and radiates the laser light to a photoresist surface of a disc-shaped glass original disc 54 on which photoresist is coated as a photosensitive material.

The optical modulator 52 modulates laser light emitted from the laser light source 51 corresponding to a recording signal. The mastering apparatus radiates the modulated laser light to the glass original disc 54. As a result, a master on which data has been recorded is produced. A servo circuit (not shown) is disposed to control the distance between the optical pickup 53 and the glass original disc 54 (namely, to keep the modulated laser light constant) and to control the rotating and driving operations of a spindle motor 55. The spindle motor 55 drives the rotations of the glass original disc 54 at for example constant linear velocity.

A recording signal is supplied from a sync adding circuit 71 to the optical modulator 52. Digital data to be recorded is supplied from input terminals 61a and 61b. The data supplied from the input terminal 61a is converted into a CD-ROM format by an CD-ROM encoder 62. Thereafter, the CD-ROM format data is supplied to a CIRC (Cross Interleave Reed-Solomon Code) encoder 63. The data supplied from the input terminal 61b is CD-ROM format data. Thus, the data supplied from the input terminal 61b is directly supplied to the CIRC encoder 63 not through the CD-ROM encoder 62.

The CIRC encoder 63 performs an error correction code encoding process for adding error correction parity data or the like and a scrambling process. In other words, 16 bits of one sample or one word is divided into two symbols of high order eight bits and low order eight bits. In the unit of one symbol, an error correction code encoding process for adding error correction parity data or the like according to for example CIRC and a scrambling process are performed.

Sub code data of channels P to W according to the current CD standard is supplied from an input terminal 61c. When additional data is recorded (buried) using only an error detection result (information that represents whether or not there is an error) obtained in the reproducing operation, only current sub code data is input. In contrast, when new data that has the same format as sub code data and that can be read by the new type reproducing apparatus or recording and reproducing apparatus is recorded as additional data, besides regular sub code data, new data is input. The regular sub code data and the new data are switched and input to a sub code encoder 64. When the new data is represented with a combination of time codes of sub code data, the sub code encoder 64 has not only the regular sub code data forming function, but a function for combining time codes corresponding to the additional data.

Sub cod data that is input from the input terminal 61c is converted into a sub code frame format by the sub code encoder 64. One of the generation polynomials gv (x) and gw (x) is selected by a switch circuit 65 and the selected generation polynomial is supplied to the sub code encoder 64. In other words, a data generating portion 66a that generates data of the generation polynomial gv (x) is connected to one input terminal a of the switch circuit 65. A data generating portion 66b that generates data of the generation polynomial gw (x) is connected to another input terminal b of the switch circuit 65. For example, the data generating portions 66a and 66b generate data of 16 bits corresponding to the two generation polynomials. The switch circuit 65 switches only coefficients.

The switch circuit 65 is controlled corresponding to a switching control signal supplied from a switch controller 67. Additional data is supplied from an input terminal designated by reference numeral 68 to the switch controller 67. When additional data is input, the switch controller 67 controls the switch circuit 65 corresponding to the additional data. In other words, in the example shown in FIG. 11, switching information for the generation polynomials corresponds to additional information. The additional information is supplied from a controller (not shown) that controls the overall mastering apparatus to the switch controller 67.

Main data supplied from the CIRC encoder 63 and output data of the sub code encoder 64 are added by an adding device 69. An output of the adding device 69 is supplied to an EFM modulator 70. The EFM modulator 70 converts an eight-bit symbol into 14-channel-bit data corresponding to a conversion table. Output data of the FM modulator 70 is supplied to the sync adding circuit 71. The sync adding circuit 71 adds a frame sync to the output data of the EFM modulator 70. The sync adding circuit 71 generates a recording signal in the foregoing frame format.

The recording signal is supplied to the optical modulator 52. Photoresist on the glass original disc 54 is exposed with laser light modulated by the optical modulator 52. The glass original disc 54 that has been exposed namely recoded in such a manner is developed. A predetermined electroplating process is performed for the glass original disc 54. As a result, a metal master is produced. Thereafter, a mother disc is produced from the metal master. Next, a stamper is produced from the mother disc. With the stamper, by a compression molding method, an injection molding method, or the like, a disc substrate for the optical disc 1 is produced. The foregoing recording layer made of aluminum is coated on the disc substrate. As a result, a reproduction-only optical disc is produced.

Figure 12:
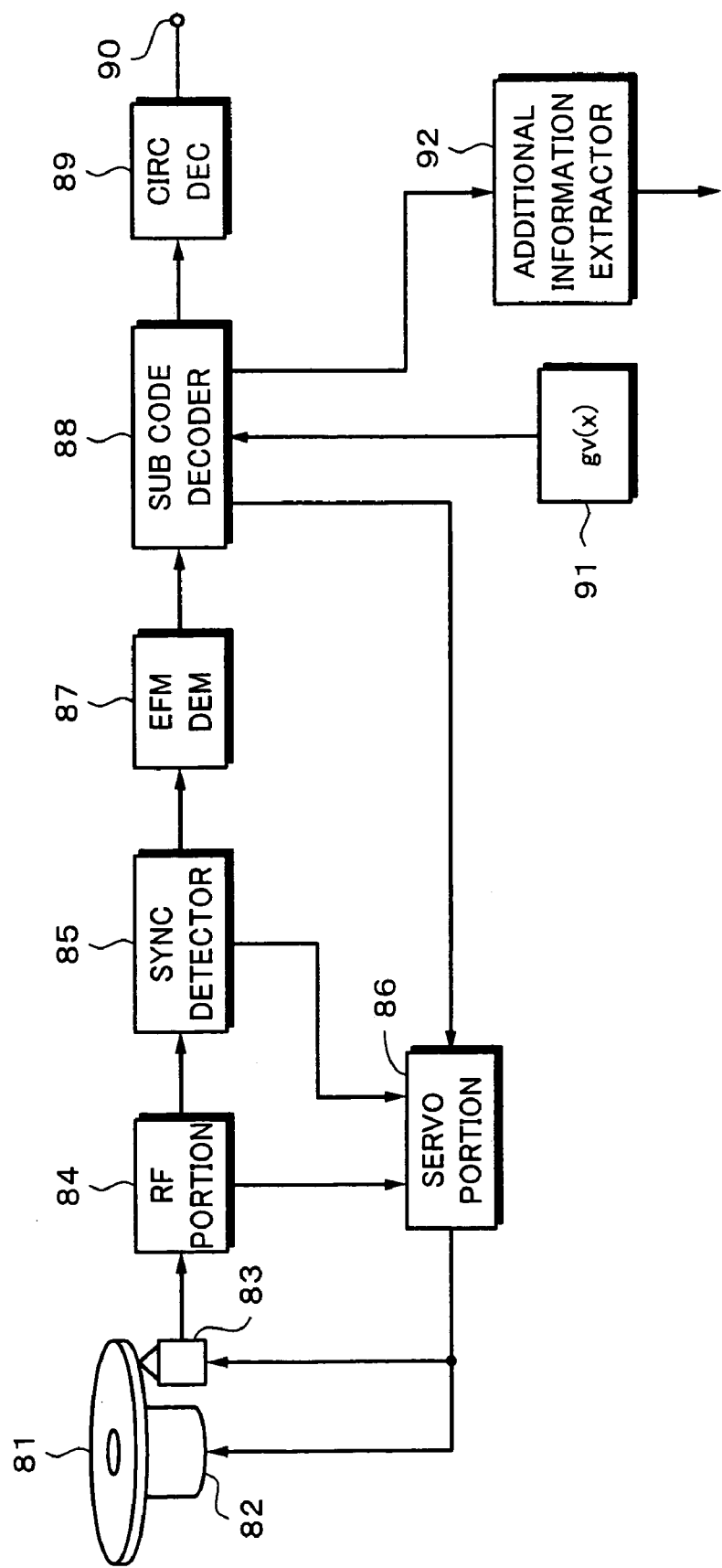
FIG. 12 is a block diagram showing an example of a reproducing apparatus according to the present invention.

FIG. 12 shows an example of a reproducing apparatus that reproduces data from an optical disc 81, which is produced by a stamper, which is produced by the foregoing mastering apparatus. The optical disc 81 is held on a turn table and rotated by a spindle motor 82. The rotations of the spindle motor 82 are driven at constant linear velocity (CLV) or constant angular velocity (CAV) under the control of a servo portion 86.

The servo portion 86 generates a focus error signal, a tracking error signal, and various types of servo drive signals for a focus servo drive, a tracking servo drive, and a spindle servo drive corresponding to operation commands supplied from a controller (not shown) and outputs the generated signals to the spindle motor 82 and an optical pickup 83. The controller (not shown) controls the overall reproducing apparatus. A display, an operation switch, and so forth are connected to the controller. While focusing laser light of a semiconductor laser as a laser light source on a signal surface of the optical disc 81, the optical pickup 83 traces tracks formed in a concentric circle shape or a spiral shape on the optical disc 81. The whole optical pickup 83 is traveled by a thread mechanism (not shown).

An output signal of the optical pickup 83 is supplied to a sync detector 85 through an RF portion 84. An output signal of the sync detector 85 is supplied to an EFM demodulator 87. The EFM demodulator 87 performs an EFM demodulation. Output data of the demodulator 87 is supplied to a sub code decoder 88. The sub code decoder 88 extracts sub code data from the output data of the demodulator 87. Output data of the sub code decoder 88 is supplied to a CIRC system error correction code decoding circuit (hereinafter referred to as CIRC decoder) 89. Reproduced data whose errors have been corrected by the CIRC decoder 89 is extracted from an output terminal 90.

When data recorded on the optical disc 81 is reproduced, the optical pickup 83 accesses a desired position of the optical disc 81. The optical pickup 83 reads data from the program area of the optical disc 81. An output signal of the optical pickup 83 is supplied to the CIRC decoder 89 through an RF portion 84, the sync detector 85, the demodulator 87, and the sub code decoder 88. The CIRC decoder 89 performs a CIRC error correcting process. The reproduced data is output to the output terminal 90. Preferably, when the optical disc 81 is loaded to the reproducing apparatus, the operation of the optical pickup 83 is controlled so that TOC data is read from the lead-in area LI, data is read from the area AR2, additional data is extracted from the area AR2, and then data is reproduced from the program area.

Since the structure shown in FIG. 12 corresponds to the conventional CD player or CD-ROM drive, the sub code decoder 88 performs the error detecting process with only the generation polynomial gv (x). Thus, as was described with reference to FIG. 9A to FIG. 9D, a portion that has been encoded with the other generation polynomial gw (x) is always detected as data that has an error. The error detection result for a sub code in the predetermined area AR2 is supplied to an additional information extractor 92.

The additional data extractor 92 extracts an error detection result with the generation polynomial gv (x) as additional data. In other words, the error detection result corresponds to switching information for the two generation polynomials. The additional data supplied from the additional data extractor 92 is supplied to a controller and so forth (not shown). When the additional data represents whether the optical disc 81 from which data is reproduced is an original optical disc or a copied optical disc, it is determined whether or not the error detection result or the switching information of the generation polynomials is predetermined data. When the determined result represents that they match, it is determined that the optical disc from which data is reproduced is an original optical disc. When the determined result represents that they do not match, it is determined that the optical disc 81 is a copied optical disc. When the determined result represents that the optical disc 81 is a copied optical disc, the reproducing apparatus is controlled so that it stops the reproducing operation for the optical disc 81.

When the additional data extracted by the additional information extractor 92 composes encryption key data or a part thereof, the encryption key data is generated from the extracted additional data. With the generated encryption key data, encrypted data that is recorded on the optical disc is decrypted. When the additional data is disc ID data that is unique to the optical disc 81, the disc ID data is generated corresponding to the extracted additional data. With the disc ID data, various applications are executed.

FIG. 13 shows another example of the reproducing apparatus according to the present invention. Since the structure of the reproducing apparatus shown in FIG. 13 is the same as the structure of the reproducing apparatus shown in FIG. 12 except for the structure regarding the sub code decoder 88, the same portions are omitted in FIG. 13. In FIG. 13, a generation polynomial selected by a switch circuit 93 is supplied to the sub code decoder 88. A data generating portion 91a generates coefficient data of the generation polynomial gv (x). A data generating portion 91b generates coefficient data of the generation polynomial gw (x).

The switch circuit 93 selects the generation polynomial gv (x) or gw (x) in the same relation as the recording operation in the area AR2 under the control of a switch controller 94 and supplies the selected generation polynomial to the sub code decoder 88. A control signal is supplied from a controller (not shown) to the switch controller 94 through a terminal 96. The controller has information as to how the two generation polynomials should be switched. In the same relation as the recording operation, information as to how two generation polynomials should be switched, namely a control signal, can be supplied to the switch controller 94. Thus, assuming that no error occurs, the error detection result for sub code data always represents no error. As was described with reference to FIG. 9B, data A to data E are reproduced as additional data from an area in which data has been encoded with the generation polynomial gw (x) as an error detection code. A additional data extractor 95 extracts data A to E and outputs them to an output terminal 97.

The additional data that is extracted to the output terminal 97 is supplied to a controller (not shown). The controller controls the access of the optical disc 81 corresponding to the additional data. The additional data is used as for example encryption key data or a part thereof. With the encryption key data, encrypted data recorded on the optical disc 81 is decrypted. Thus, encrypted data can be reproduced by only the new type reproducing apparatus that is structured as shown in FIG. 13.

It should be noted that the present invention is not limited to the foregoing embodiment. Instead, without departing from the sprit of the present invention, various modifications and ramifications are available. In the foregoing example, the present invention is applied to the case that sub code data is encoded with an error detection code. However, the present invention can be applied to the case that data of a CD-ROM disc is encoded with an error detection code. In other words, in mode 1 and mode 2 (form 1) formats of the CD-ROM standard, after an error is corrected, data of one block (one sector) is encoded to detected an error.

In mode 1, a total of 2064 bytes of a sync signal (12 bytes), a header (four bytes), and data of 2048 bytes are encoded with an error detection code and a CRC of four bytes is added. The generation polynomial is G1 (x)=$(x^{16}+x^{15}+x^2+1)$ $(x^{16}+x^3+x+1)=x^{32}+x^{31}+x^{16}+x^4+x^3+x+1$. With another generation polynomial that has the same number of degrees as and different coefficients from that generation polynomial for example G2 (x)=$(x^{16}+x^{15}+x^2+1)\cdot(x^{16}+x^2+x+1)$, a part of blocks is encoded with the other generation polynomial. As a result, like the foregoing sub code data, additional data can be recorded.

In the foregoing, an example of which generation polynomials of error detection code encoding are switched was described. However, the present invention can be applied to the case that error correction code encoding systems are switched. As an example of the error correction code encoding system, a b-adjacent code is known. The adjacent code uses a matrix T where a bit expression of the generation polynomial is placed at the last row.

As another error correction code encoding system, the Reed-Solomon code is known. The Reed-Solomon code is a BCH code composed of factors of Galois Field GF $(2^r)$. The BCH code is an error correction code processed in the unit of one bit. The Reed-Solomon code processed in the unit of for example eight bits (one byte) defines an irreducible polynomial for example $x^8+x^4+x^3+x^2+1$ in Galois Field GF $(2^8)$. Assuming that the root of the polynomial is denoted by a, factors of Galois Field GF ($2^8$) are represented by powers of a or a polynomial. This irreducible polynomial is also referred to as primitive polynomial. In other words, a value a that satisfies F (x)=0 in polynomial F (x) is referred to as root of F (x). A polynomial of r-th degree with two unknowns of which a primitive factor of GF ($2^r$) is a root is referred to as primitive polynomial.

In a CIRC for a CD, the Reed-Solomon code that can correct dual errors is used. In other words, as a generation polynomial G (x), G (x)=(x+1)(x+α)(x+$α^2$)(x+$α^3$) is used. A generation polynomial of an adjacent code is also a primitive polynomial. Thus, when the present invention is applied to the adjacent code, BCH code, or Reed-Solomon code, primitive polynomials are switched. For example, as another primitive polynomial, $x^8+x^6+x^5+x^2+1$ is used. As another method, with the same primitive polynomial, methods for generating primitive polynomials may be switched. For example, in the foregoing example, a generation polynomial of which a term (x+1) is removed is used. Alternatively, both primitive polynomials and methods for producing generation polynomials may be switched.

In the foregoing, an example of which the present invention is applied to an optical disc as a data recording medium was described. However, the present invention is not limited to such a data recording medium. Instead, the present invention can be applied to the case that content data is transmitted and data is received. When the present invention is applied to the case that data is transmitted and received, the structure of the recording system shown in FIG. 11 corresponds to the structure of the transmitting system. Recorded data is supplied to the transmitting portion. The transmitting portion sends the recorded data to a wired or wireless communication path. Likewise, the structure of the reproducing system shown in FIG. 13 corresponds to the structure of the receiving system. Received data is supplied to an RF portion. The RF portion extracts decoded data out of the received data.

In the foregoing example, the recording apparatus (transmitting apparatus) and the reproducing apparatus (receiving apparatus) are composed of hardware. Alternatively, with application software of a computer and a recording and reproducing apparatus as a disc drive, the recording process or reproducing process may be performed. In that case, additional information that cannot be reproduced by the conventional application can be read by the new application.

According to the present invention, with the same data structure, a plurality of types of error detection code encoding or error correction code encoding are performed. With the decoded result, additional information can be reproduced. Unlike with a system that causes data to be an error, the present invention can be used as a standard for a conventional data format. Thus, the reliability is remarkably improved. In addition, the possibility of which an error that naturally occurs in the recording and reproducing processes becomes an outer disturbance can be suppressed. When the conventional reproducing apparatus or drive reproduces data from the data recording medium according to the present invention, since the apparatus or drive can reproduce additional information as information that represents whether or not there is an error, the present invention can be advantageously applied to the conventional apparatus. On the other hand, the new type reproducing apparatus or drive can read data that the conventional drive reads as an error. The new type reproducing apparatus can use the data that has been read as additional information. In addition, the conventional apparatus cannot copy additional information. Consequently, the secrecy of the additional information can be improved.

The invention claimed is:

1. A recording medium having at least a lead-in area, a data recording area to which data is recorded, and a lead-out area, wherein the data recording, area comprises:
    a first recording area portion to which data that has been encoded with a first generation polynomial as an error correction code is recorded; and
    a second recording area portion to which data that has been encoded with the first generation polynomial as an error correction code and data that has been encoded with a second generation polynomial as an error correction code are mixedly recorded, wherein
    the first and second generation polynomials as error correction codes are selected corresponding to identification data that identifies the recording medium as an original recording medium or a copied recording medium.

2. The recording medium as set forth in claim 1, wherein the first and second generation polynomials as error correction codes are generation polynomials according to a cyclic redundancy check code system.

3. The data recording medium as set forth in claim 2, wherein when a parity to be generated is 16 bits, the first and second generation polynomials g (x) are any one of g1 (x)=$x^{16}+x^{12}+x^5+1$, g2 (x)=$x^{16}+x^{15}+x^2+1$, and g3 (x)=$x^{16}+x^2+x+1$, and
    wherein when a parity to be generated is 32 bits, the first and second generation polynomials g (x) are combinations of any two of g1 (x), g2 (x), and g3 (x).

4. The recording medium as set forth in claim 1, wherein data recorded to the second recording area portion contains at least any one of data with respect to an address and data with respect to time, and
    wherein any one of the data with respect to an address and the data with respect to time is encoded with the first and second generation polynomials as error correction codes and recorded to the second recording area portion.

5. The recording medium as set forth in claim 1, wherein data recorded to the second recording area portion contains sub code data, and
    wherein the sub code data is encoded with the first and second generation polynomials as error correction codes and recorded to the second recording area portion.

6. A recording medium having at least a lead-in area, a data recording area to which data is recorded, and a lead-out area, wherein the data recording area comprises:
    a first recording area portion to which data that has been encoded with a first primitive polynomial and/or generation polynomial as an error correction code is recorded; and
    a second recording area portion to which data that has been encoded with the first primitive polynomial and/or generation polynomial as an error correction code and data that has been encoded with a second generation polynomial as an error correction code are mixedly recorded, wherein
    the first and second primitive polynomials and/or generation polynomials as error correction codes are selected corresponding to data that composes at least a part of encryption key data.

7. The recording medium as set forth in claim 6,
wherein the first and second primitive polynomials and/or generation polynomials as error correction codes are primitive polynomials according to a Reed-Solomon encoding system.

8. The recording medium as set forth in claim 7,
wherein when a parity to be generated is eight bits, the first and second primitive polynomials f (x) are f1 (x)=$x^8+x^4+x^3+x^2+1$ and f2(x)=$x^8+x^6+x^5+x^4+1$.

9. The recording medium as set forth in claim 6,
wherein the first and second primitive polynomials and/or generation polynomials as error correction codes are primitive polynomials according to a BCH encoding system.

10. The recording medium as set forth in claim 6,
wherein data recorded to the second recording area portion contains at least any one of data with respect to an address and data with respect to time, and
wherein any one of the data with respect to an address and the data with respect to time is encoded with the first and second primitive polynomials and/or generation polynomials as error correction codes and recorded to the second recording area portion.

11. The recording medium as set forth in claim 6,
wherein data recorded to the second recording area portion contains sub code data, and
wherein the sub code data is encoded with the first and second generation primitive polynomials and/or generation polynomials as error correction codes and recorded to the second recording area portion.

12. A recording method for a recording medium, comprising the steps of:
when data is recorded to the recording medium, recording data that has been encoded with a first generation polynomial as an error correction code to a first recording area portion; and
recording data that has been encoded with a first generation polynomial as an error correction code and data that has been encoded with a second generation polynomial as an error correction code to a second recording area portion, wherein
the first and second generation polynomials as error correction codes are selected corresponding to data that identifies the recording medium as an original recording medium or a copied recording medium.

13. The recording method for the recording medium as set forth in claim 12,
wherein the first and second generation polynomials as error correction codes are generation polynomials according to a cyclic redundant check code system.

14. The recording method for the data recording medium as set forth in claim 13,
wherein when a parity to be generated is 16 bits, the first and second generation polynomials g (x) are any one of g1 (x)=$x^{16}+x^{12}+x^5+1$, g2 (x)=$x^{16}+x^{15}+x^2+1$, and g3 (x)=$x^{16}+x^{2+x}+1$, and
wherein when a parity to be generated is 32 bits, the first and second generation polynomials g (x) are combinations of any two of g1 (x), g2 (x), and g3 (x).

15. The recording method for the recording medium as set forth in claim 12,
wherein the first and second generation polynomials as error correction codes are selected corresponding to additional data.

16. The recording method for the recording medium as set forth in claim 12, wherein data recorded to the second recording area portion contains at least any one of data with respect to an address and data with respect to time, and
wherein any one of the data with respect to an address and the data with respect to time is encoded with the first and second generation polynomials as error correction codes and recorded to the second recording area portion.

17. The recording method for the recording medium as set forth in claim 12,
wherein data recorded to the second recording area portion contains sub code data, and
wherein the sub code data is encoded with the first and second generation polynomials as error correction codes and recorded to the second recording area portion.

18. A recording apparatus for a recording medium, comprising:
an error correction code encoding process portion for performing an error correction code encoding process for input data;
a generating portion for generating data that has been encoded with a plurality of types of respective primitive polynomials and/or generation polynomials as error correction codes;
a signal processing portion, to which output data of the signal process portion and data that has been encoded with the plurality of types of primitive polynomials and/or generation polynomials as error correction codes, for performing a recording signal process for the supplied data; and
a recording portion, to which output data of the signal process portion is supplied, for recording the supplied data to a recording medium,
wherein the generating portion comprises:
a first data generating portion for generating data with respect to a first primitive polynomial according to a first Reed-Solomon encoding system as an error correction code; and
a second data generating portion for generating data with respect to a second primitive polynomial according to a second Reed-Solomon encoding system as an error correction code, wherein
the first and second primitive polynomials as error correction codes are selected corresponding to identification data that identifies the recording medium as an original recording medium or a copied recording medium.

19. The recording apparatus for the recording medium as set forth in claim 18,
wherein the first primitive polynomial and/or generation polynomial as an error correction code is a generation polynomial according to a first cyclic redundancy check code encoding system, and
wherein the second primitive polynomial and/or generation polynomial as an error correction code is a generation polynomial according to a second cyclic redundancy check code encoding system.

20. The recording apparatus for the data recording medium as set forth in claim 19,
wherein when a parity to be generated is 16 bits, the first and second generation polynomials g (x) are any one of g1 (x)=$x^{16}+x^{12}+x^51$, g2 (x)=$x^{16}+x^{15}+x^2+1$, and g3 (x)=$x^{16}+x^{2+x}+1$, and
wherein when a parity to be generated is 32 bits, the first and second generation polynomials are combinations of any two of g1 (x), g2 (x), and g3 (x).

21. The recording apparatus for the recording medium as set forth in claim 18,
   wherein when a parity to be generated is eight bits, the first and second primitive polynomials f (x) are one of f1 $(x)=x^8+x^4+x^3+x^2+1$ and f2 $(x)=x^8+x^6+x^5+x^4+1$ and the other, respectively.

22. The recording apparatus for the recording medium as set forth in claim 18,
   wherein the first and second primitive polynomials and/or generation polynomials as error correction codes are primitive polynomials according to a BCH encoding system.

23. The recording apparatus as set forth in claim 18, further comprising:
   a controlling portion for generating a switching control signal corresponding to additional data,
   wherein the generating portion has a selecting portion for switching data supplied from the first data generating portion and data supplied from the second data generating portion corresponding to the switching control signal supplied from the controlling portion and outputting the switched data, and
   wherein the data generating portion generates encoded data with any one of the data generated by the first data generating portion and the data generated by the second data generating portion.

24. A reproducing apparatus for a recording medium having at least a lead-in area, a data recording area to which data is recorded, and a lead-out area, wherein the data recording area comprises a first recording area portion to which data that has been encoded with an error correction code is recorded; and
   a second recording area portion to which at least data that has been encoded with a plurality of types of generation polynomials as error correction codes, the reproducing apparatus, comprising:
   a head portion for reading data from the recording medium;
   a demodulating process portion for performing a demodulating process for data that has been read from the recording medium by the head portion;
   a signal process portion for performing an error detecting process for data that has been output from the demodulating process portion and that has been read from the second recording area portion with any one of the plurality of types of primitive polynomials and/or generation polynomials as error correction codes; and
   an extracting portion for extracting additional data corresponding to an error detection result of the signal process portion,
   wherein the apparatus is configured to identify the recording medium as an original recording medium or a copied recording medium corresponding to the extracted additional data,
   wherein the signal process portion comprises:
      a first data generating portion for generating data with respect to a first primitive polynomial and/or generation polynomial as an error correction code:
      a second data generating portion for generating data with respect to a second primitive polynomial and/or generation polynomial as an error correction code:
      a controlling portion for generating a switching control signal corresponding to additional data: and
      a selecting portion for selecting data supplied from the first generating portion and data that is supplied from the second data generating portion corresponding to the switching control signal supplied from the controlling portion and outputting the switched data,
   wherein the signal processing portion is configured to perform an error detecting process with any one of data generated by the first data generating portion and the data generated by the second data generating portion.

25. The reproducing apparatus for the recording medium as set forth in claim 24,
   wherein the extracting portion is configured to extract the additional data depending on whether or not the error detection result of the signal process portion represents an error.

26. The reproducing apparatus for the recording medium as set forth in claim 24, further comprising:
   an error correcting process portion for performing an error correcting process for data that has been output from the decoding process portion and that has been read from the first recording area portion of the recording medium.

27. A reproducing method for a recording medium having at least a data recording area in which data is recorded, the data recording area having a first recording area portion to which data that has been encoded with an error correction code is recorded; and
   a second recording area portion to which at least data that has been encoded with a plurality of types of generation polynomials as error correction codes, the reproducing method, comprising the steps of:
   performing a demodulating process for data that has been read from the recording medium;
   performing an error detecting process for data for which the demodulating process has been performed and that has been read from the second recording area portion with any one of the plurality of types of primitive polynomials and/or generation polynomials as error correction codes;
   extracting additional data corresponding to the result of the error detecting process; and
   identifying the recording medium as an original recording medium or a copied recording medium corresponding to the extracted additional data;
   wherein the step of performing an error detecting process comprises:
      generating first data with respect to a first primitive polynomial and/or generation polynomial as an error correction code;
      generating second data with respect to a second primitive polynomial and/or generation polynomial as an error correction code;
      generating a switching control signal corresponding to additional data:
      selecting the first data and the second data corresponding to the switching control signal and outputting the switched data; and
      performing an error detecting process with any one of the first data and the second data.

28. The reproducing method for the recording medium as set forth in claim 27,
   wherein the extracting step is performed by extracting the additional data depending on whether or not the error detection result represents an error.

29. The reproducing method for the recording medium as set forth in claim 27, further comprising the step of:

performing an error correcting process for data for which the decoding process has been performed and that has been read from the first recording area portion of the recording medium.

30. An identifying method for a recording medium having at least a lead-in area, a data recording area to which data is recorded, and a lead-out area, wherein the data recording area comprises a first recording area portion to which data that has been encoded with an error correction code is recorded; and a second recording area portion to which at least data that has been encoded with a plurality of types of generation polynomials as error correction codes, the identifying method, comprising the steps of:

performing a demodulating process for data that has been read from the recording medium;

performing an error detecting process for data for which the demodulating process has been performed and that has been read from the second recording area portion with any one of the plurality of types of primitive polynomials and/or generation polynomials as error correction codes; and identifying the recording medium as an original recording medium or a copied recording medium corresponding to the result of the error detecting process.

31. The identifying method for the recording medium as set forth in claim 30, wherein the identifying step comprises the steps of:

extracting additional data corresponding to the result of the error detecting process; and identifying the recording medium as an original recording medium or a copied recording medium corresponding to the extracted additional data.

32. The identifying method for the recording medium as set forth in claim 31, wherein the extracting step is performed by extracting the additional data depending on whether or not the result of the error detecting process represents an error.

33. A data transmitting method, comprising the steps of:

when data is transmitted, transmitting first data that has been encoded with a first generation polynomial as an error correction code and second data that contains a mixture of data that has been encoded with a first generation polynomial as an error correction code and data that has been encoded with a second generation polynomial as an error correction code, wherein the first and second generation polynomials as error correction codes are selected corresponding to data that composes at least a part of encryption key data.

34. The data transmitting method as set forth in claim 33, wherein the first and second generation polynomials as error correction codes are generation polynomials according to a cyclic redundant check code system.

35. The data transmitting method as set forth in claim 27, wherein when a parity to be generated is 16 bits, the first and second generation polynomials g (x) are any one of g1 $(x)=x^{16}+x^{12}+x^{5}+1$, g2 $(x)=x^{16}+x^{15}+x^{2}+1$, and g3 $(x)=x^{16}+x^{2}+x+1$, and wherein when a parity to be generated is 32 bits, the first and second generation polynomials g (x) are combinations of any two of g1 (x), g2 (x), and g3 (x).

36. The data transmitting method as set forth in claim 33, wherein the plurality of types of primitive polynomials and/or generation polynomials as error correction codes are selected corresponding to additional data.

37. A data receiving process method, comprising the steps of:

receiving data composed of first data that has been encoded with an error correction code and second data that has been encoded with a plurality of types of primitive polynomials and/or generation polynomials as error correction codes;

performing an error detecting process for the second data of the received data with one of the plurality of types of primitive polynomials and/or generation polynomials as error correction codes;

extracting additional data corresponding to the result of the error detecting process; and identifying the received data as original data or copied data corresponding to the extracted additional data, wherein the step of performing an error detecting process comprises:

generating first data with respect to a first primitive polynomial and/or generation polynomial as an error correction code;

generating second data with respect to a second primitive polynomial and/or generation polynomial as an error correction code;

generating a switching control signal corresponding to additional data;

selecting the first data and the second data corresponding to the switching control signal and outputting the switched data; and performing an error detecting process with any one of the first data and the second data.

38. The data receiving process method as set forth in claim 37, wherein the extracting step is performed by extracting the additional data depending on whether or not the result of the error detecting process represents an error.

39. The data receiving process method as set forth in claim 37, further comprising the step of:

performing an error correcting process for the first data of the received data.

40. A recording method for a recording medium, comprising the steps of:

when data is recorded to the recording medium, recording data that has been encoded with a first generation polynomial as an error correction code to a first recording area portion; and recording data that has been encoded with a first generation polynomial as an error correction code and data that has been encoded with a second generation polynomial as an error correction code to a second recording area portion, wherein the first and second generation polynomials as error correction codes are selected corresponding to data that comprises at least a part of encryption key data.

* * * * *

UNITED STATES PATENT AND TRADEMARK OFFICE
CERTIFICATE OF CORRECTION

PATENT NO. : 7,274,642 B2  
APPLICATION NO. : 10/474200  
DATED : September 25, 2007  
INVENTOR(S) : Yoichiro Sako et al.

It is certified that error appears in the above-identified patent and that said Letters Patent is hereby corrected as shown below:

Column 2, line 12, change "11" to -- 6 --;
          line 22, change "22" to -- 12 --;
          line 32, change "35" to -- 18 --.
Column 9, line 50, change "mode other" to -- mode 5 other --.
Column 16, line 45, change ") (" to -- )·( --.
Column 17, line 1, change "a" to -- α --;
          line 2, change "a" to -- α --;
          line 4, change "a" to -- α --.
Column 19, line 57, change "$x^{2+x+}1$" to -- $x^2 + x + 1$ --.
Column 20, line 63, change "$x^5\ 1$" to -- $x^5 + 1$ --;
          line 64, change "$x^{2+x+}1$" to -- $x^2 + x + 1$ --.

Signed and Sealed this

Fifteenth Day of July, 2008

JON W. DUDAS
*Director of the United States Patent and Trademark Office*